Feb. 24, 1970 W. C. STEWART 3,497,707
INTERCONNECTION AND CONTROL SYSTEM
Filed Sept. 29, 1967 2 Sheets-Sheet 1

INVENTOR.
Wilfred C. Stewart
BY
Harness, Dickey & Pierce
ATTORNEYS.

Feb. 24, 1970    W. C. STEWART    3,497,707
INTERCONNECTION AND CONTROL SYSTEM
Filed Sept. 29, 1967    2 Sheets-Sheet 2
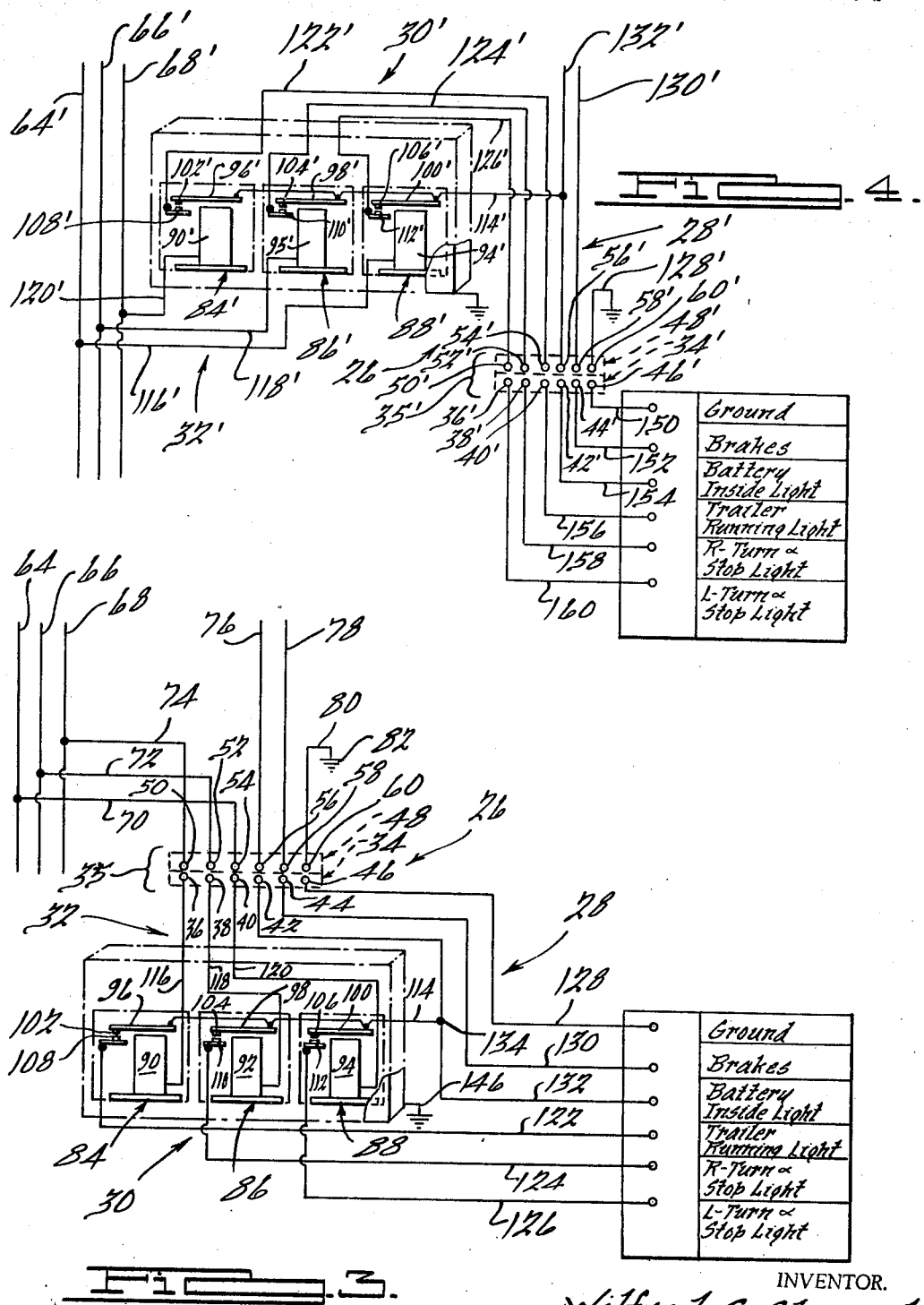
INVENTOR.
Wilfred C. Stewart
BY
Harness, Dickey & Pierce
ATTORNEYS.

United States Patent Office 3,497,707
Patented Feb. 24, 1970

3,497,707
INTERCONNECTION AND CONTROL SYSTEM
Wilfred C. Stewart, 7249 Charlesworth Road,
Dearborn Heights, Mich. 48127
Filed Sept. 29, 1967, Ser. No. 671,748
Int. Cl. B60l 1/06
U.S. Cl. 307—9  12 Claims

ABSTRACT OF THE DISCLOSURE

A control system adapted for operative association with an automotive vehicle and vehicle trailer for selectively communicating electric current to the electrical system of the trailer in response to energization of the electrical system of the vehicle; the control system comprising an auxiliary power circuit adapted to conduct electrical power from a suitable source thereof on the vehicle, such as the vehicle battery, generator or the like; a switching circuit communicable with the auxiliary power circuit and the electrical system of the vehicle trailer, and a sensing circuit responsive to energization of the electrical system of the vehicle to effect actuation of the switching circuit, whereby electrical power is conducted from the power circuit to the electrical system of the trailer independently of the electrical system of the vehicle.

---

The purpose of the above abststract is to provide a non-legal technical statement of the disclosure of the contents of the instant patent application and thus serve as a searching-scanning tool for scientists, engineers and researchers. Accordingly, this abstract is not intended to be used in understanding the principles of the present invention hereinafter described in detail, nor is it intended to be used in interpreting or in any way limiting the scope or fair meaning of the claims appended hereto.

BACKGROUND OF THE INVENTION

Most states and municipalities have inacted laws and ordinances requiring that automotive vehicles towing vehicle trailers provide means for visually indicating the presence of such trailers during periods of poor visibility and for providing a visual warning rearwardly of the trailer of the intentions of the vehicle operator to stop or turn. Such visual indicating means have conventionally been in the form of clearance, running and/or license plate lights, and such warning means have been in the form of stop or brake lights and turn signal lights located on the rearward side of the trailer.

One particular problem that has been common place as a result of providing the aforesaid type of indicating and warning lights on vehicle trailers has evolved from the practice of utilizing the existing wiring and electrical system of the associated vehicle for purposes of conducting electrical current from the vehicle battery or generator to the lights on the trailer. That is, the vehicle wiring systems have been called upon to not only conduct electrical current to the indicating and warning lights normally provided on the vehicle itself, but also to carry the current supplied to the lights on the associated trailer. Accordingly, at such time as both the vehicle and trailer lights have been simultaneously energized, the wiring systems of the automotive vehicles have been in constant danger of being seriously overloaded, with the result that such wiring systems have been frequently damaged or, at best, capable of subjecting the associated vehicles to the potential dangers of electrical fires. Moreover, the extremely unsafe practice of inserting potentially dangerous oversize electrical fuses in the vehicle electrical systems has been attempted by many vehicle operators in order to obviate the electrical overloading problems created when the vehicle electrical systems have been used to conduct electric current to the associated trailers.

In accordance with the principles of the present invention, the aforementioned problems associated with providing adequate indicating and warning lights on vehicle trailers are overcome through the provision of a novel electrical interconnection and control system adapted to function in selectively communicating electric current to the trailer lights without subjecting the wiring system of the associated automotive vehicle to any overloading. More particularly, the control system of the present invention comprises a plurality of cooperative electrical circuits including an auxiliary power circuit adapted to conduct electric current directly from the source of such current normally provided in a vehicle, i.e., battery, generator, etc. The control system incorporates a plurality of low amperage drawing switches or relay assemblies adapted to be selectively closed in response to energization of the indicating and warning lights on the vehicle, whereby to selectively communicate electric current from the auxiliary power circuit to the electrical system on the vehicle trailer, with the result that the aforesaid auxiliary circuit will conduct electrical current directly from the electrical power source in the vehicle to the lights on the trailer independently of the wiring system of the vehicle. By virtue of the fact that the control system requires only low amperage current to effect actuation of the aforesaid relay assemblies, the wiring system of the vehicle is not subjected to any overloading, thus overcoming the aforedescribed potential electrical overloading problems.

Since the various circuits of the control system of the present invention are designed to be operatively associated with both the electrical system of the vehicle and the electrical system incorporated in the associated vehicle trailer, a wiring means harness extending between the vehicle and the trailer is utilized to operatively connect the vehicle and trailer electrical systems with each other, as well as with the subject control system. Preferably, a detachable multi-terminal plug or electrical connector is provided on the wiring harness so that said harness may be operatively connected and detached from the trailer or the vehicle when the trailer is not in use. In a preferred embodiment of the present invention described herein, the various electrical circuits of the subject control system are designed to be located within the trailer itself and be connected to the electrical system of the vehicle by means of a wiring harnes of the aforementioned type extending from the vehicle to the trailer. In an alternate embodiment of the present invention, the above described circuits are located within the vehicle itself, and the wiring harness is utilized to connect these circuits with the electrical system of the trailer. Thus, it will be seen that the present invention lends itself to a variety of different installations and will therefore find universality of application.

SUMMARY OF THE INVENTION

This invention relates generally to electrical control systems and, more particularly, to a new and improved control system adapted for use with automotive vehicles and associated vehicle trailers.

It is accordingly a general object of the present invention to provide a new and improved control system for selectively communicating electric current from an automotive vehicle electrical system to the electrical system of an associated vehicle trailer.

It is a more particular object of the present invention to provide a new and improved control system of the above character which obviates the possibility of overloading the electrical system of the vehicle.

It is another object of the present invention to provide a new and improved control system as above described which includes a plurality of relay-like devices for selectively communicating electric current from an auxiliary current conducting circuit to the electrical system of the vehicle trailer.

It is still another object of the present invention to provide a new and improved control system of the above type wherein the relay-like devices are actuated in response to signals produced upon energization of the vehicle lighting system.

It is a further object of the present invention to provide a new and improved control system of the above character which is of a relatively simple design, is easy to assemble and install, and economical to commercially manufacture.

It is yet another object of the present invention to provide a new and improved control system of the above character which may be operatively mounted within either the automotive vehicle itself or within the associated vehicle trailer, thereby providing for universality of installation.

Other objects and advantages of the present invention will become apparent from the following detailed description, taken in conjunction with the accompanying drawings.

BRIEF DESCRIPTION OF THE DRAWINGS

FIGURE 3 is a schematic representation of the electrical circuit embodying the control system of the present invention; and FIGURE 4 is a schematic representation of an electric circuit embodied in an alternate embodiment of the present invention.

DESCRIPTION OF A PREFERRED EMBODIMENT

Figure 1:
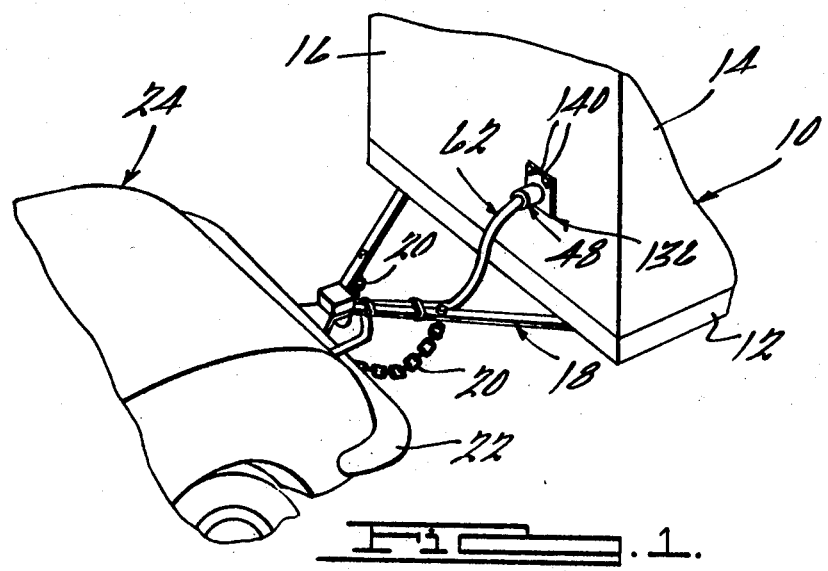
FIGURE 1 is an elevated perspective view of a portion of an automotive vehicle and associated vehicle trailer having the control system of the present invention in operative association therewith.

Referring now to FIGURE 1 of the drawings, a portion of a transportable or towable vehicle trailer, generally designated by the numeral 10, is shown as comprising a trailer frame 12, one lateral side portion 14 and a forward side or front portion 16. The trailer 10 is adapted to be connected by means of a suitable trailer hitch assembly 18 and safety chains 20 to the rearward end portion or rear bumper 22 of a conventional automotive vehicle, a portion of which is shown herein and generally designated by the numeral 24. For purposes of description of the present invention, the trailer may be considered to have a "grounded" type electrical system including conventional running lights and/or a suitable light for illuminating the trailer license plate, as well as with one or more stop or brake lights and "right" and "left" turn signal lights, all of which are well known in the art. Similarly, the automotive vehicle 24 may be considered to have a grounded type electrical system and be provided with some type of running or license plate lights and "right" and "left" brake and turn signal lights. Generally speaking, the present invention is adapted to provide an interconnection and control system for selectively energizing the aforesaid running, brake and turn signal lights on the trailer in response to and simultaneously with energization of the corresponding lights provided on the vehicle, as will hereinafter be described in detail.

Figure 2:
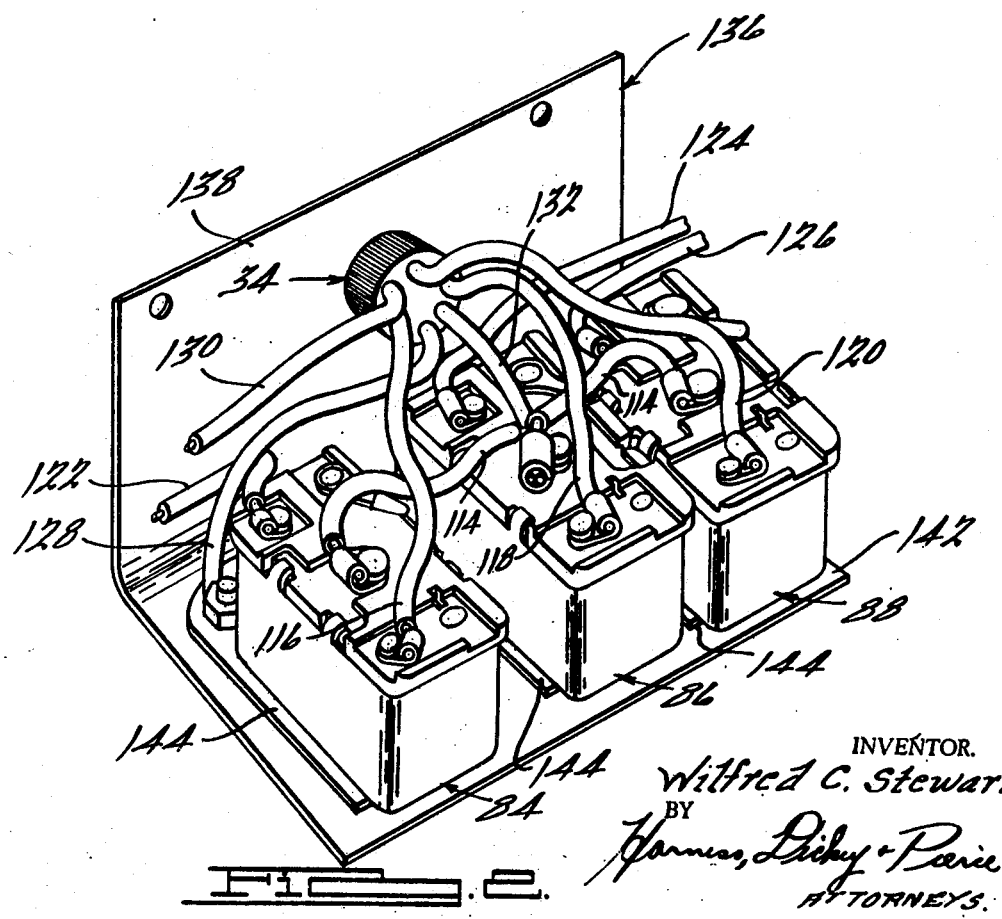
FIGURE 2 is an elevated perspective view of a preferred embodiment of the control system of the present invention.

Referring now to FIGURES 2 and 3 of the drawings, a control system, generally designated 26, in accordance with a preferred embodiment of the present invention, is shown as comprising a plurality of cooperative electrical circuits, namely, an auxiliary power circuit 28, a switching or relay circuit 30 and a signal sensing circuit 32. The circuits 28, 30 and 32 are shown in operative association with the socket or female section 34 of a detachable multi-terminal electrical connector assembly schematically illustrated in FIGURE 3 and generally designated by the numeral 35. The socket section 34 comprises a plurality of terminals 36, 38, 40, 42, 44 and 46 and is adapted to be operatively connected to a matingly engageable plug or male section 48 of the assembly 35 which comprises a plurality of electrical terminals 50, 52, 54, 56, 58 and 60 adapted to make electrical contact with the terminals 36–46, respectively, in a manner well known in the art upon interconnection of the sections 34 and 48. In a preferred construction of the control system 26 of the present invention, the aforementioned electrical circuits 28, 30 and 32, as well as the socket section 34 are located on the trailer 10, while the plug section 48 is operatively mounted on the rearward end of a wiring harness that extends rearwardly from the vehicle 24 to the trailer 10, as is illustrated in FIGURE 1 by the numeral 62.

The control system 26 is adapted to be operatively associated with that portion of the electrical wiring system of the vehicle 24 schematically shown in FIGURE 3 as comprising a plurality of electrical conductors 64, 66 and 68 which are connected to the "left" turn signal and stop light, "right" turn signal and stop light, and running and/or license plate lights, respectively, of the vehicle 24. The conductors 64, 66 and 68 are communicable with the plug section 48 by means of suitable conductors 70, 72 and 74 disposed within the wiring harness 62 and connected to the terminals 50, 52 and 54, respectively. The terminals 56 and 58 of the plug section 48 are adapted to be connected through a pair of conductors 76 and 78 with a source of electrical power within the vehicle 24, such as the battery, generator, etc. (not shown), and the terminal 60 is adapted to be connected through a conductor 80 with a suitable grounded portion of the vehicle, as indicated at 82.

Referring now in detail to the control system 26 and in particular to the switching circuit 30 thereof, it will be seen that the circuit 30 comprises a plurality of electrically actuated, relatively low amperage drawing switch or relay assemblies 84, 86 and 88 that include relay coils 90, 92 and 94 and armatures 96, 98 and 100, respectively. The armatures 96–100 are provided with movable terminals or contacts 102, 104 and 106 that are operatively engageable with associated fixed contacts 108, 110 and 112, respectively, upon proper energization of the associated coils 90, 92 and 94, respectively. The armatures 96, 98 and 100 are electrically connected through a common electrical conductor 114 with each other and with the auxiliary power circuit 28 in the manner later to be described.

The signal sensing circuit 32 of the control system 26 comprises a plurality of conductors 116, 118 and 120 that are adapted to be connected to the terminals 36, 38 and 40, respectively, and to the relay coils 90, 92 and 94, respectively. As will later be described, the sensing circuit 32 is adapted to sense the presence of a signal produced as electric current is transmitted through the conductors 64, 66 and 68 of the vehicle electrical system, whereby to effectuate energization of the relay assemblies 84, 86 and 88.

As schematically illustrated in FIGURE 3, the fixed contacts 108, 110 and 112 are connected by means of suitable conductors 122, 124 and 126 with the trailer running lights, the "right" turn signal and stop light, and "left" turn signal and stop light, respectively, of the vehicle trailer 10 such that energization of any one or more of the relay coils 90, 92 or 94 completes a circuit between the conductors 122, 124 and/or 126 and the common conductor 114.

The auxiliary power circuit 28 is shown as comprising a plurality of conductors 128, 130 and 132, the former of which is connected to the terminal 46 of the socket section 34 and to a suitable grounded portion of the vehicle trailer 24. The conductors 130 and 132 are connected to the terminals 44 and 42, respectively, with the conductor 132 being connected to the common conductor 114, as seen at 134 in FIGURE 3. The conductor 130 is adapted to supply electrical current to any auxiliary electrical accessories on the trailer 10 as, for example, to an electrical braking system or the like which might be provided on the trailer 10. The conductor 132 is intended to supply electrical current to the electrical lighting system provided interiorly of the trailer 10, as well as to the trailer battery. For example, the conductor 132 may be used to supply electric current to the internal lights and/or internal wall receptacle used for supplying electric current to lamps, appliances, etc. used in the trailer 10.

The electrical circuits 28, 30 and 32 incorporated in the control system 26 of the present invention are intended to be mounted within a suitable housing, enclosure or the like located within the trailer 10. By way of example, a portion of such a housing is shown in FIGURE 2 and generally designated by the numeral 136. The housing 136 is shown as comprising a mounting panel 138 that may be mounted within the forward side portion 16 of the trailer 10 by means of suitable screws, bolts or the like illustrated in FIGURE 1 and designated by the numeral 140. Extending rearwardly from the lower end of the mounting panel 138 is a support plate 142 upon which the relay assemblies 84, 86 and 88 may be mounted by means of suitable mounting brackets or the like 144. The mounting panel 138 is adapted to operatively support the socket section 34 in the manner illustrated in FIGURE 2 so that the plug section 48 on the rearward end of the wiring harness 62 may be easily engaged therewith to operatively connect the electrical system of the vehicle 24 with the control system 26. As shown in FIGURE 3, the housing 136 is preferably grounded to the trailer 10, as seen at 146 and said housing 136 may be provided with a suitable cover (not shown) for completely enclosing the various electrical relays and conductors incorporated in the circuits 28, 30 and 32. It will be readily apparent, of course, that a wide variety of different types of housings or enclosures may be used for operatively mounting the control system 26 of the present invention, and that the size and configuration of the housing 136 may be easily modified in accordance with different trailer constructions.

FIGURE 4 illustrates an alternate embodiment of the present invention wherein the control system and associated enclosure means therefore are adapted to be located within the vehicle 24 instead of within the associated vehicle trailer 10. With this construction, a wiring harness connected at the forward end thereof directly to the control system within the vehicle extends rearwardly toward the trailer and is adapted to be operatively attached by means of a suitable electrical connector or the like to the electrical system of the trailer. By virtue of the fact that the control system illustrated in FIGURE 4 is of essentially the same construction and operation as the control system 26 hereinbefore described in detail, said alternate system will be described herein with the various circuits and electrical conductors thereof analogous to the components of the system 26 being identified by the same reference numerals having a prime (′) suffix.

Referring now in detail to FIGURE 4, a control system 26′ is shown as comprising a plurality of cooperative electrical circuits, namely an auxiliary power circuit 28′, a switching or relay circuit 30′ and a signal sensing circuit 32′. The circuits 28′, 30′ and 32′ are shown in operative association with the "plug" or male section 48′ of a detachable electrical connector assembly 35′. The plug section 48′ comprises a plurality of electrical terminals 50′, 52′, 54′, 56′, 58′ and 60′ and is adapted to be associated with a matingly engageable socket or female section 34′ which comprises a plurality of terminals 36′, 38′, 40′, 42′, 44′ and 46′.

The control system 26′ is associated with a portion of the vehicle wiring system schematically illustrated herein as comprising conductors 64′, 66′ and 68′ connected to the "left" turn signal and stop light, "right" turn signal and stop light, and running and/or license plate lights of the associated vehicle.

The switching circuit 30′ comprises a plurality of low amperage switch or relay assemblies 84′, 86′ and 88′ including relay coils 90′, and 92′ and 94′ and armatures 96′, 98′ and 100′, respectively. The relay assemblies 84′, 86′ and 88′ have movable terminals or contacts 102′, 104′ and 106′ and fixed contacts 108′, 110′ and 112′, respectively, and the armatures 96′, 98′ and 100′ are connected through a common electrical conductor 114′ with the auxiliary power circuit 28′. The signal sensing circuit 32′ comprises a plurality of conductors 116′, 118′ and 120′ adapted to be connected to the conductors 64′, 66′ and 68′, and to the relay coils 90′, 92′ and 94′. The auxiliary power circuit 28′ comprises a plurality of conductors 128′, 130′ and 132′, the former of which is connected to a suitable ground and the latter two of which are connected to a suitable source of electrical power within the associated vehicle, such as the battery, generator or the like. As illustrated, the fixed contacts 108′, 110′ and 112′ are connected by means of suitable conductors 122′, 124′ and 126′ with the terminals 50′, 52′ and 54′, respectively, and the conductors 128′, 130′ and 132′ are connected to the terminals 60′, 58′ and 56′, respectively.

The socket section 34′ of the connector 35′ is adapted to be connected to the electrical system of the associated trailer by means of a plurality of conductors which extend between the terminals 36′, 38′, 40′, 42′, 44′ and 46′ and the various accessories and/or lighting systems on the trailer. In particular, the terminal 46′ is connected by means of a suitable conductor 150 with a grounded portion of the trailer, and the terminal 44′ is connected through a conductor 152 to any electrical accessories in the trailer as, for example, electrically energized brakes or the like. The terminal 42′ is connected through a conductor 154 to supply electric current to the electrical interior lights and battery of the trailer, and the terminal 40′ is connected by means of a conductor 156 to the trailer running lights. The terminals 38′ and 36′ are connected by means of conductors 158 and 160 to the "right" turn and stop lights of the trailer and "left" turn stop lights of the trailer, respectively.

Since the construction and operation of the control system 26 and 26′ are, for all practical purposes, identical, a detailed description of the operation of the present invention will be made with particular reference being made to only the control system 26.

In operation, assuming that the plug section 48 of the connector 35 is properly engaged with the socket section 34 thereof, the various terminals 50-60 will be properly engaged with the terminals 36-46 and thus operatively connect the wiring harness 62 with the control system 26. Because of the direct connection through the connector 35 of the conductors 76 and 78 with the conductors 130 and 132, electric power will be conducted directly to the electrical accessories of the trailer 10 and to the battery and interior lights thereof, as will be apparaent. During normal traveling or towing of the vehicle trailer 10, the armatures 96, 98 and 100 will be in the positions illustrated in FIGURE 3, with the movable contacts 102, 104 and 106 thereof being disengaged from the fixed contacts 108, 110 and 112, respectively. At such time as the vehicle operator turns on the running and/or license plate lights of the vehicle, current will be conducted through the conductor 68. This current will produce a signal, the presence of which will be sensed by the conductor 116, resulting in energization of the coil 90 and movement of the armature 96 to its respective closed position to engage the contact 102 with the associated contact 108. When the contacts 102 and 108 are thus engaged, a circuit is completed from the conductor 132 which carries electrical current from the proper source thereof provided in the associated vehicle, to the conductor 122 connected to the trailer running lights, with the result that these running lights will be energized. When the running lights of the vehicle are turned off, current will stop flowing through the conductor 68, resulting in deenergization of the relay coil 90 and opening of the contacts 102 and 108, with the further result that the running lights of the trailer will be turned off. In a similar manner, when the "right" and/or "left" turn and stop lights of the vehicle are turned on, current will be conducted through the conductors 64 and 66. This current will produce a signal which is sensed by the conductors 118 and/or 120, resulting in the relay coils 94 and/or 92 being energized. When either of the coil 92, 94 are thus energized, the associated armatures are closed, thereby causing engagement of the contacts 104, 110 and/ or 106, 112, to complete electric circuits between the conductor 114 and the conductor 124 and/or 126 connected to the proper turn signal or stop lights on the trailer. Upon deenergization of the stop or turn signal lights of the vehicle, current will cease to flow through the conductors 64, 66 and the relay coils 94, 92 will be deenergized, resulting in the armatures 100, 98, respectively, opening to effect deenergization of the associated lights on the trailer.

It will be seen from the foregoing that electric current is supplied to the electrical system of the trailer 10 without requiring that the wiring system of the vehicle be used for purposes of conducting such current. Accordingly, the possibility of overloading the vehicle electrical system when towing the trailer 10 is virtually entirely obviated, thereby enhancing the safety characteristics of the vehicle. It will be noted that because the control system 26 of the present invention may be mounted in either the trailer or the associated vehicle, the present invention will find universality of application and increased marketing potential. It will also be noted that the control system of the present invention is not intended to be limited to grounded type electrical systems as is commonly found in modern automotive vehicles, since the control system of the present invention may be readily adapted for use in electrical systems of the non-grounded type. Moreover, it will be readily apparent to anyone skilled in the art that the present invention is not limited to a construction embodying the above described switching or relay assemblies, since various other types of electronic devices, such as transistors and the like could be utilized in the subject control system for accomplishing the same function as the said relay assemblies. By virtue of the extreme simplicity of design and operation, the control system of the present invention may be economically manufactured, easily assembled and installed, and will have a long and effective operational life.

While it will be apparent that the embodiments illustrated herein are well calculated to fulfill the objects above stated, it will be appreciated that the present invention is susceptible to modification, variation and change without departing from the proper scope or fair meaning of the subjoined claims.

I claim:

1. In combination with an automotive vehicle including a vehicle electrical system, a source of electric power in the vehicle, and having in operative association therewith, a vehicle trailer provided with its own electrical system, a control system comprising an auxiliary power circuit including main conductive means adapted to conduct electric current from said source thereof on said vehicle to said trailer, a switching circuit communicable with said auxiliary power circuit and said electrical system on said trailer, and a signal sensing circuit responsive to signals produced upon selective energization of said electrical system of said vehicle to effect actuation of said switching circuit in response to said selective energization, whereby electric current is conducted from said auxiliary power circuit to said electrical system of said trailer electrically independently of said electrical system of said vehicle with a minimum amount of current drain from said vehicle electrical system.

2. The combination as set forth in claim 1 wherein said electrical system of said vehicle includes lighting means, and wherein said sensing circuit is responsive to signals produced upon energization of said lighting means to effect actuation of said switching circuit.

3. The combination as set forth in claim 1 wherein said electrical system of said trailer includes lighting means, and wherein said auxiliary power circuit is connected through said switching circuit to said lighting means, whereby actuation of the switching circuit completes an electrical circuit between said auxiliary power circuit and said lighting means.

4. The combination as set forth in claim 1 wherein said switching circuit comprises relay means adapted to be actuated upon energization of a preselected portion of said electrical system of said vehicle.

5. The combination as set forth in claim 1 wherein said control system is operatively mounted within said vehicle trailer.

6. The combination as set forth in claim 1 wherein said control system is operatively mounted within said vehicle.

7. The combination as set forth in claim 1 wherein said auxiliary power circuit comprises at least one conductor member adapted to communicate electric power from said source ot said electrical system of said trailer, wherein said switching circuit comprises at least one relay means communicable with said one conductor member, and wherein said sensing circuit comprises at least one conductor communicable with said electrical system of said vehicle and said relay means, whereby said sensing circuit means is adapted to effect actuation of said relay means and thereby complete an electrical circuit between said auxiliary power circuit means and said electrical system of said trailer.

8. The combination as set forth in claim 7 wherein said electrical system of said trailer includes a plurality of electrically energized accessories, and which includes at least one of said relay means for selctively communicating said auxiliary power circuit with each of said accessories.

9. The combination as set forth in claim 1 wherein said vehicle electrical system comprises an indicating light, a warning light and a separate conductor communicating each of said lights with said source of electrical power, wherein said trailer electrical system comprises an indicating light and a warning light, wherein said switching circuit comprises a pair of relay assemblies each including a relay coil and an armature movable between open and closed positions, wherein said auxiliary power circuit is communicable with said source of electrical power and each of said armatures, wherein said sensing circuit comprises a first conductor communicable with the armature of one of said relay assemblies and one of said conductors of said vehicle electrical system, and a second conductor communicable with the armature of the other of said relay assemblies and the other of said conductors of said vehicle electrical system, and which includes conductor means communicating one of said relay assemblies with said indicating light in said trailer electrical system and the other of said relay assemblies with said warning light in said trailer electrical system.

10. The combination as set forth in claim 9 wherein said control system is mounted within said trailer and which includes wiring harness means selectively communicating said auxiliary power circuit and said sensing circuit with said vehicle electrical system.

11. The combination as set forth in claim 9 wherein said control system is operatively mounted in said vehicle and which includes wiring harness means communicating said control system with said trailer electrical system.

12. In the combination of an automotive vehicle having an electrical system, a source of electric power and having in operative association therewith, a vehicle trailer provided with its own electrical system, the method of selectively energizing the electrical system of the trailer in response to energization of the electrical system of the vehicle, which includes the steps of:
- providing an auxiliary power circuit for conducting electric current from the source to to the electrical system of the trailer independently of the electrical system of the vehicle,
- providing a switching means for selectively completing a circuit between said auxiliary power circuit and said trailer electrical system, and
- selectively actuating said switching means in response to a signal produced upon energization of said vehicle electrical system.

References Cited

UNITED STATES PATENTS

| | | | |
|---|---|---|---|
| 2,140,109 | 12/1938 | Kellar | 280—422 X |
| 3,090,871 | 5/1963 | Gorman | 307—10 |
| 3,110,507 | 11/1963 | Riner | 280—422 |

OTHER REFERENCES

HERMAN O. JONES, Primary Examiner
H. J. HOHAUSER, Assistant Examiner

U.S. Cl X.R.
280—422; 180—82, 96